United States Patent Office 2,912,217
Patented Nov. 10, 1959

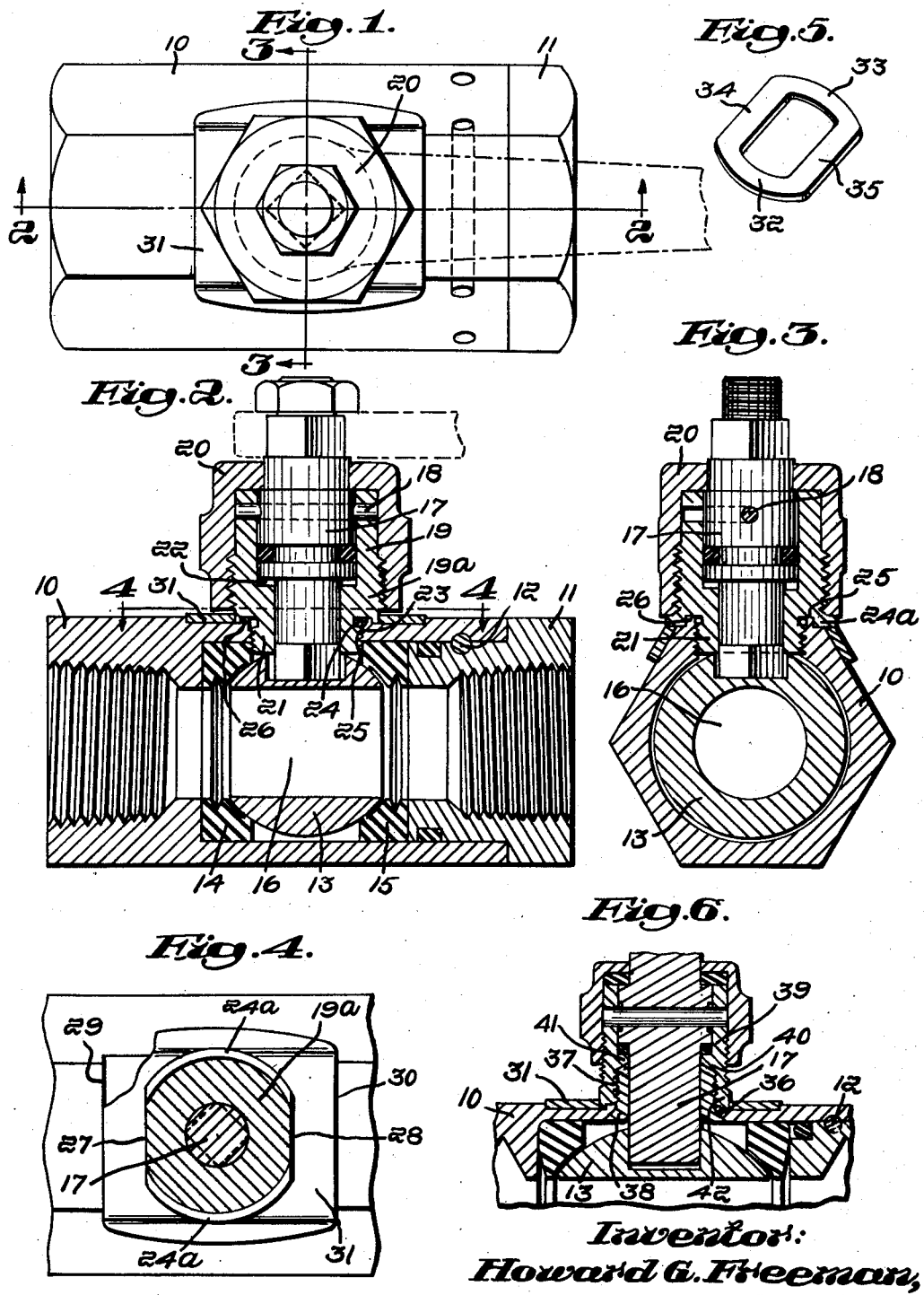

2,912,217

SEAL FOR VALVE BONNET

Howard G. Freeman, Worcester, and Oscar R. Vandreuil, Leicester, Mass., assignors to Jamesbury Corp., Worcester, Mass., a corporation of Massachusetts Application April 22, 1955, Serial No. 503,056

2 Claims. (Cl. 251—214)

This invention relates to valve bonnets and more particularly to means for sealing the joint between the bonnet and the body of a ball valve.

Valves of the type to which this invention relates consist in general of a valve body, in which a ball having appropriate ports is rotatably mounted, a bonnet mounted on the side of the body, and a stem which passes through the bonnet and engages the ball to control its rotary movement. The bonnet is ordinarily made separately from the body and the joint between the two must be sealed in some manner so as to be fluid-tight. This is frequently accomplished by brazing or welding the bonnet to the valve body. There is a considerable demand, however, for valves made of special corrosion or abrasion resistant materials, many of which cannot be satisfactorily brazed or welded. A simple threaded connection is likely to work loose and cause leakage.

The principal object of this invention is to provide a mechanical connection between the body and bonnet of a valve of the type described above, which eliminates the need for brazing or welding the parts together, and which remains fluid-tight under all conditions of use. Other objects are to produce a valve which is relatively inexpensive to manufacture and easy to assemble.

In the drawings illustrating the invention:

Fig. 1 is a plan view of a valve constructed according to the invention;

Fig. 2 is a cross-section taken along line 2—2 of Fig. 1;

Fig. 3 is a cross-section taken along line 3—3 of Fig. 1;

Fig. 4 is a cross-section taken along line 4—4 of Fig. 2;

Fig. 5 is a detail, viewed in isometric, of the locking ring for the bonnet; and Fig. 6 is a cross-section, partly broken away, similar to Fig. 2, showing a modified form of bonnet connection.

The valve body 10 is assembled to a body cap 11 in a conventional manner and secured by means of pins 12. The ball 13, which is the control element of the valve, is disposed within the body and seats against seating rings 14 and 15. The ball has a port 16, which is aligned with the pipe line when the valve is open, and is engaged by the squared lower end of stem 17. The latter has a pin 18 in its upper portion, which engages in slots in the upper part of bonnet 19, to limit the rotational movement of the stem. The stem is secured by a bonnet cap 20. The particular seating ring arrangement and the connection between the stem and the ball here illustrated is the subject matter of my copending application Serial No. 436,188, filed June 11, 1954, but it is understood that the valve body and bonnet construction here described can be applied equally well to valves of different construction.

In the form shown in Figs. 1 to 4, the bonnet 19 is a generally cylindrical piece, externally threaded on the upper part 19a to receive the bonnet cap, and having a reduced lower end 21. The upper part of the stem 17 is rotatably mounted in a counterbored recess 22 in the upper part of the bonnet, and the lower end of the stem passes through the lower part of the bonnet into the valve body to engage the ball.

The lower part 21 of the bonnet is externally threaded and screws into a threaded hole 23 in the valve body. The upper part 19a overhangs the lower part to form a shoulder 24, and a groove 25 is cut in this shoulder all around the under side. Outside of this groove is a projecting flange 24a. The valve body 10 is counterbored around opening 23, leaving a bead 26 around the opening. The upper surface of this bead and the bottom surface of groove 25 are accurately machined so as to form a fluid-tight joint when the two are brought tightly together by screwing the bonnet down. In order to prevent the bonnet from working loose, as it is likely to do because of constant movement of the stem, temperature changes, vibration, internal pressure, and other conditions encountered in use, it must be locked to the body. This is accomplished as follows:

After the bonnet has been screwed down to seat bead 26 tightly in groove 25, the assembly is milled along two parallel lines to form flat sides 27 and 28, at the same time removing the housing material along either side of the bonnet to the depth of the counterbore which originally formed the bead 26, leaving a shallow recess with straight edges 29 and 30 on the housing. A locking collar 31 is then placed over the bonnet. As shown in Fig. 5, this collar has curved sides 32 and 33 and straight sides 34 and 35. The curved sides fit around the rounded parts of the bonnet rim 24a which remain after milling, and the straight sides seat in the recess on the body wall between flat faces 27, 28, and the edges 29, 30 of the recess. On small valves the curved sides 32 and 33 are bent down over the sides of the body as shown in Fig. 3. On larger valve housings with hexagonal faces the collar may remain flat. To hold the collar in place, the parts of rim 24a remaining after milling are spun over the collar along the inner edges of sides 32 and 33. When the assembly is completed, the bonnet is held by a positive mechanical lock and cannot turn on the body to work loose.

In the modification shown in Fig. 6, the wall 36 of the hole in the body through which the stem 17 enters, is a sloping surface so that the hole widens in diameter toward the inside of the body. A sleeve 37, having a frusto-conical flange 38 on its lower end, is mounted in this hole, and the sleeve is externally threaded to receive the bonnet 39 which has an internally threaded lower portion. The upper part of the bonnet is externally threaded to receive the bonnet cap, and the bonnet has a flange 42 around its lower part. Sleeve 37 has a frusto-conical top surface 40 and bonnet 39 has a bevelled internal shoulder 41. When the bonnet is screwed down, the sloping surface 36 engages flange 38 of the sleeve and shoulder 41 engages surface 40 to form tight seals. The two sides of the bonnet flange 42 are then machined flat, and the housing simultaneously machined to form the straight edges 29 and 30. The collar 31 is applied and seated between the flattened sides of the bonnet flange and the edges 29 and 30. The remaining curved portions of flange 42 are then spun over to retain the collar, in the same manner as the remaining portions of rim 24a.

What is claimed is:

1. In a valve of the type including a valve body provided with an opening, and a stem received in said opening to engage a working element inside the body; an externally threaded inner sleeve disposed in said opening and surrounding said stem, said inner sleeve having a bottom flange with a frusto-conical upper surface, and the body having a bevelled surface around said opening engaging said frusto-conical upper surface to form a seal, an internally threaded outer sleeve surrounding and threadably engaging said inner sleeve, said outer sleeve having a bottom flange engaging said body, and the last mentioned flange having flattened side portions, walls on said body disposed to either side of said outer sleeve and parallel to said flattened portions, and a locking collar surrounding said outer sleeve, said collar having a pair of straight inner edges engaging said flattened portions, and a pair of straight outer edges engaging said walls to lock the outer sleeve against rotation with respect to the body.

2. A valve bonnet assembly as described in claim 1, the inner sleeve having an upwardly extending portion with a frusto-conical top surface, and the outer sleeve having a bevelled internal shoulder seated on said top surface.

References Cited in the file of this patent
UNITED STATES PATENTS

| | | |
|---|---|---|
| 1,707,931 | Gibbons | Apr. 2, 1929 |
| 2,511,889 | Weiss | June 20, 1950 |
| 2,622,839 | Wagner | Dec. 23, 1952 |
| 2,718,373 | Henry | Sept. 20, 1955 |

FOREIGN PATENTS

| | | |
|---|---|---|
| 165,550 | Great Britain | July 6, 1921 |